US011954698B2

(12) United States Patent
Guionnet et al.

(10) Patent No.: US 11,954,698 B2
(45) Date of Patent: Apr. 9, 2024

(54) METHOD FOR ENRICHING A DIGITAL CONTENT WITH SPONTANEOUS DATA

(71) Applicant: ORANGE, Issy-les-Moulineaux (FR)

(72) Inventors: Chantal Guionnet, Chatillon (FR); Frederic Massa, Chatillon (FR); Anne Nicole Pouzet, Chatillon (FR); Herve Maudier, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 559 days.

(21) Appl. No.: 16/493,170

(22) PCT Filed: Mar. 12, 2018

(86) PCT No.: PCT/FR2018/050580
§ 371 (c)(1),
(2) Date: Sep. 11, 2019

(87) PCT Pub. No.: WO2018/167420
PCT Pub. Date: Sep. 20, 2018

(65) Prior Publication Data
US 2020/0074482 A1    Mar. 5, 2020

(30) Foreign Application Priority Data
Mar. 14, 2017   (FR) .................................... 1752063

(51) Int. Cl.
*G06Q 30/0201*    (2023.01)
*G06F 3/0482*    (2013.01)
(Continued)

(52) U.S. Cl.
CPC ....... *G06Q 30/0201* (2013.01); *G06F 3/0482* (2013.01); *G06F 21/10* (2013.01);
(Continued)

(58) Field of Classification Search
CPC ... G06F 21/10; G06F 3/0482; G06Q 30/0201; G06Q 50/01; H04H 60/33; H04L 51/52
(Continued)

(56) References Cited

U.S. PATENT DOCUMENTS

| 7,533,805 | B1 * | 5/2009 | Enright | ................. | G06Q 40/00 |
| | | | | | 235/379 |
| 2004/0001616 | A1 * | 1/2004 | Gutta | ..................... | G06Q 30/02 |
| | | | | | 382/118 |

FOREIGN PATENT DOCUMENTS

| WO | 2008030542 A2 | 3/2008 | | |
| WO | WO-2008/030542 | * | 3/2008 | ............. G06Q 30/00 |
| WO | WO 2017223513 | * | 12/2017 | ............. G03B 17/54 |

OTHER PUBLICATIONS

International Search Report dated Apr. 17, 2018 for corresponding International Application No. PCT/FR2018/050580, filed Mar. 12, 2018.
(Continued)

*Primary Examiner* — Yosef K Laekemariam
(74) *Attorney, Agent, or Firm* — David D. Brush; Westman, Champlin & Koehler, P.A.

(57) ABSTRACT

A method for associating perception data with a first content, which is implemented by a processor includes: triggering at least one capture using a capturing device in the direction of at least one individual, referred to as an observer, consulting the first content, the result of the capture being designated as second content; analyzing distinctive elements of the second content and transposing the distinctive elements into perception data; and associating the perception data with the first content.

21 Claims, 4 Drawing Sheets

(51) Int. Cl.
*G06F 21/10* (2013.01)
*G06Q 50/00* (2012.01)
*H04H 60/33* (2008.01)
*H04L 51/52* (2022.01)

(52) U.S. Cl.
CPC ............. *G06Q 50/01* (2013.01); *H04H 60/33* (2013.01); *H04L 51/52* (2022.05)

(58) Field of Classification Search
USPC .............. 348/94, 231.2, 231.3, 231.4, 231.6, 348/333.12
See application file for complete search history.

(56) References Cited

OTHER PUBLICATIONS

Written Opinion of the International Searching Authority dated Apr. 17, 2018 for corresponding International Application No. PCT/FR2018/050580, filed Mar. 12, 2018.

English translation of the Written Opinion of the International Searching Authority dated Apr. 17, 2018 for corresponding International Application No. PCT/FR2018/050580, filed Mar. 12, 2018.

\* cited by examiner

METHOD FOR ENRICHING A DIGITAL CONTENT WITH SPONTANEOUS DATA

CROSS-REFERENCE TO RELATED APPLICATIONS

This Application is a Section 371 National Stage Application of International Application No. PCT/FR2018/050580, filed Mar. 12, 2018, which is incorporated by reference in its entirety and published as WO 2018/167420 A1 on Sep. 20, 2018, not in English.

FIELD OF THE INVENTION

The field of the invention is that of digital contents such as images, photos, videos or audio recordings, and in particular of digital data characterizing these contents, input manually or automatically. These digital data are for example metadata, tags, etc.

The communication network used by devices such as computers, mobile telephones, tablets, etc. to exchange, store or consult/view these contents and these data characterizing these contents, is arbitrary; for example the latter may be an Internet network, a local network, etc.

The invention finds applications in the field of digital contents management, mining-related services in the consumer field, etc.

TECHNOLOGICAL BACKGROUND

Millions of digital contents are created and shared every second by millions of users across the world, in particular by virtue of connected mobile devices integrating a device for capturing photos or videos.

From its creation to its storage, to its dissemination or indeed its re-dissemination, to one or more recipients and across various communication services, each digital content constructs its own journey over time, and during this journey, this content will generally be consulted/viewed by several observers, and even several times by some of these observers.

In parallel, the exchanges between a sender and a recipient of a content on the subject of the emotions provoked by a photo, in particular those provoked in the recipient who discovers the photo (or rediscovers it subsequently), are customarily performed on a declarative mode. Indeed, any recipient may be invited to return their impressions under a declarative and asynchronous mode, for example by posting a "like" on the Facebook service, by sending a "smiley" through an instant messaging service, by calling the sender to exchange by telephone, etc.

However, the owner (or the sender) of digital contents does not possess any solution for constructing an "emotional history" of the digital contents that he stores, that he consults/views, and/or that he shares with his followers or with a wider public.

The invention offers a solution not exhibiting the drawbacks of the prior art.

THE INVENTION

To this effect, according to a first aspect, there is proposed a method for associating perception data of a first digital content, the method implemented by a processor, comprising:

at least one triggering of capture on the basis of a capture device in the direction of at least one individual, called an observer, consulting the first content, the result of the capture being designated as second content, an analysis of distinctive elements of the second content and transposition of said distinctive elements into perception data, an association of said perception data with the first content.

The method implements an enrichment of the data characterizing a digital content. In particular, the method described here applies to gathering in an opportunistic manner data termed perception data of a digital content which arise from the analysis of expressions of the various observers of this content. By observer is meant any person benefiting from the position of potential commentator of a content; for example, in the case of a photo or of a video, the position of consultation of a content is generally situated in front of this content's display device. Hereinafter in the document, the terms "image" or "photo" will be used interchangeably to refer to one of the types of the first or second digital content which are considered in the method here described.

By this method, throughout the journey of a content traveling through devices, services, networks, storage sites etc., this content will be enriched with perception data of all or some of the observers who manipulate it.

Indeed, the number of "views" is no longer a sufficient criterion for the evaluation of a photo, the herein proposed emotional history of a photo builds an emotional dimension to this photo through the evaluation of the rating and the quantification of the perception data of its successive and/or simultaneous observers. By emotional history of a content is meant a set of perception data engendered by a content, in particular those of the emotions spontaneously expressed by its observers.

Thus, the method offers the advantage of enabling a content to be characterized by data relating to the expressions triggered thereby in observers and to be, thus, identifiable as such across industrial applications. This emotional history associated with the content affords the latter an additional dimension which is constructed over time.

In the professional world, service providers propose modes of mining for which this method would for example be useful in their approach.

According to one mode of implementation, the analysis of distinctive elements of the second content comprises an identification of at least one observer.

This mode of implementation allows attribution of the perception data gathered in the course of time according to the identity of the observers captured by the second content. Thus, the evolution of the perception data takes place in relation to each identification. In the case where one and the same observer, who may for example be the owner of the photo, consults the photo at various instants, the enrichment of the perception data feeds itself across time. In the case of an audio recording considered as second content, the identification by the characteristics of the voice of the observer or observers is performed.

According to another mode of implementation, which may be implemented alternatively or cumulatively with that above, the perception data are contained in the first content.

This mode of implementation makes it possible to integrate the perception data with the metadata of the first content. Thus, these data constitute data characteristic of the content, in the same vein for example as the date of capture of the photo or the place of capture (GPS data). In particular, these perception data, as such or through a redirection to the latter, for example by a URL link, can be integrated as metadata into a file in the EXIF format relating to an image file.

According to another mode of implementation, which may be implemented alternatively or cumulatively with those above, the second content corresponds to one or more contents of image type.

This mode of implementation makes it possible to consider the second content as the result of a capture of several photos by the capture device, for example in so-called "burst" mode. By "burst mode" is meant a succession of image captures at time intervals, equal time intervals in particular, in a limited time. This limited time can be defined by the time of action of a user on a so-called trigger device of the capture device, or by an automated system activated for a few seconds only (for example from 1 to 5 seconds): the number of images generated by the capture device then depends on the fixed time interval between each capture.

According to another mode of implementation, which may be implemented alternatively or cumulatively with those above, a capture triggering is defined by at least one capture of an image performed in a time period which begins at the start of the consultation of the first content.

This mode of implementation makes it possible to synchronize the activation of the image capture device with the start of the consultation of the first content so that opportunistic triggering can be carried out, in particular right from the start of this consultation. By "opportunistic" triggering is meant one or more captures triggered through the capture device, either by the knowledge of an evaluation of relevance of a standby time with respect to the start of the consultation of the first content, in particular in the case of consultation of a first content of image type, or by the identification of previously defined instants, in particular in the case of consultation of a first content of video type, or by the automatic detection of a module continuously analyzing the content of the field of observation of the capture device so as to label the distinctive elements that are potentially transposable into perception data.

In the first two previous cases of instants previously defined for a given content or in a given context, the data of time-stamping of the triggering or triggerings of the capture device can be input as input parameters of the device implementing the method, for example by integrating directly or indirectly time-stamping indications into the metadata of the consulted content. The second content is then a series of captures performed at various moments while reading the consulted content.

According to another mode of implementation, which may be implemented alternatively or cumulatively with those above, a capture triggering is defined by a capture of an audio and/or video content performed in a time period which begins at the start of the consultation of the first content.

This mode of implementation makes it possible to synchronize the activation of the capture device for sound or video recordings with the start of the consultation of the first content, so as to apply a triggering configured as "default". In the case of a video as second content, the analysis of the distinctive elements will be lengthier, in particular having regard to the greater volume of data generated and therefore to be analyzed, than one or more image captures; however, the relevance of the data for perception on completion of this analysis is estimated higher.

According to a variant of this mode of implementation, the analysis of distinctive elements of the second content comprises a selection of at least one image of said video content.

This variant makes it possible to search for and to extract from the second content, in the case where the latter were a video, a selection of one or more images arising from this video so as to analyze the distinctive elements of this or these images. This selection step makes it possible thereafter to apply a similar analysis to a second content which would result directly from one or more image captures.

According to another variant of this mode of implementation, the analysis of distinctive elements of the second content comprises a semantic analysis of said audio content.

This other variant makes it possible to characterize the perception of the observer or observers according to keywords sent by these observers, recorded and stored. In particular in the case of a first content of image type, more suitable for an audio recording as second content than a first content of video type, a semantic analysis allows a simple and relevant analysis, provided that data to be analyzed are collected; indeed, if a face capture is often detectable, a sound capture of a so-called "verbal" expression may be nonexistent during consultation of a content by an observer.

According to another mode of implementation, which may be implemented alternatively or cumulatively with those above, a consultation of the first content comprises a request for authorization of activation of a capture device to an observer.

This mode of implementation makes it possible to allow the observer a control. By virtue of a user interaction, a request to an observer to authorize or not the activation of one or more capture devices is made, for example by a program executed automatically when opening the digital contents consultation application.

According to a variant of this mode of implementation, the request for authorization of activation of a capture device is made during the request, made by an observer, for access to the first content.

This variant makes it possible to limit the number of appeals to the user. Just as security procedures are customarily put in place to protect against the execution of malicious programs when opening contents, the method interrogates an observer to authorize the execution of the computer program allowing the activation of the capture device upon the opening of the first content. This program can be inserted into the photo, in particular into the metadata, and the consultation application is capable of interpreting these data (text, tag, URL link, javascript program, etc.).

Moreover, this program can integrate by default the automatic deactivation of the capture device (in the case where the authorization has previously been accepted) when stopping the consultation of the given content or closing the consultation application.

According to another variant of this mode of implementation, a consultation of the first content also comprises a request for authorization to send the perception data of the first content to at least one recipient.

This other variant also makes it possible to limit the number of appeals to the observer. The method interrogates the observer to authorize the sending of the perception data when the latter are obtained. Thus, at the end of carrying out the steps of the method, a notification of the updating of the perception data will be sent to one or more recipients. These recipients designated, for example through the metadata of the first content, directly or indirectly by redirection by a storage site in the network, can thus consult the emotional history of the content. These recipients are generally the creators of this content but also simply the senders of this content.

According to another mode of implementation, which may be implemented alternatively or cumulatively with those above, the second content is deleted when the association of the perception data with the first content is terminated.

This mode of implementation makes it possible to automate the freeing of the storage area used in the device on which the content is consulted, or in a remote storage space in the network, at the end of the implementation of the method; in particular the deletion of a second content of video type.

According to a hardware aspect, the invention relates to an association device comprising an application-related module, able to associate perception data of a first digital content, the device being characterized in that it comprises:
- a module for triggering management of one or more captures on the basis of a capture device, the result of the capture being designated as second content,
- a module for analyzing distinctive elements of the second content,
- a module for transposing said distinctive elements into perception data,
- a module for associating said perception data with the first content.

By integration of the method of the invention, the application-related module allows, in particular, opportunistic triggering of the capture device to obtain a second content and optimized management of the volume of data to analyze this second content.

According to another hardware aspect, the invention also relates to a computer program able to be implemented on an association device, the program comprising code instructions which, when it is executed by a processor, carry out the method defined in this invention.

Such a program can use any programming language. It can be downloaded from a communication network and/or recorded on a computer-readable medium.

The invention also envisages a recording medium readable by a computer on which is recorded a computer program comprising program code instructions for the execution of the steps of the association method according to the invention such as is described hereinabove. Such a recording medium can be any entity or device capable of storing the program. For example, the medium can comprise a storage means, such as a ROM, for example a CD ROM or a microelectronic circuit ROM, or else a magnetic recording means, for example a USB key or a hard disk.

Moreover, such a recording medium can be a transmissible medium such as an electrical or optical signal, which can be conveyed via an electrical or optical cable, by radio or by other means, so that the computer program that it contains is executable remotely. The program according to the invention can be in particular downloaded over a network for example the Internet network.

Alternatively, the recording medium can be an integrated circuit into which the program is incorporated, the circuit being adapted to execute or to be used in the execution of the aforementioned display control method.

Of course, each of the devices comprises application means such as instructions of the aforementioned computer program, these instructions being executed by physical means such as at least one processor and a work memory.

The invention will be better understood on reading the description which follows, given by way of example and with reference to the appended drawings in which:

DETAILED DESCRIPTION OF ILLUSTRATIVE EMBODIMENTS

In the description detailed hereinafter of embodiments of the invention, numerous specific details are presented to afford a more complete understanding. Nonetheless, the person skilled in the art may appreciate that embodiments may be put into practice without these specific details. In other cases, well-known characteristics are not described in detail to avoid needlessly complicating the description.

Figure 1:
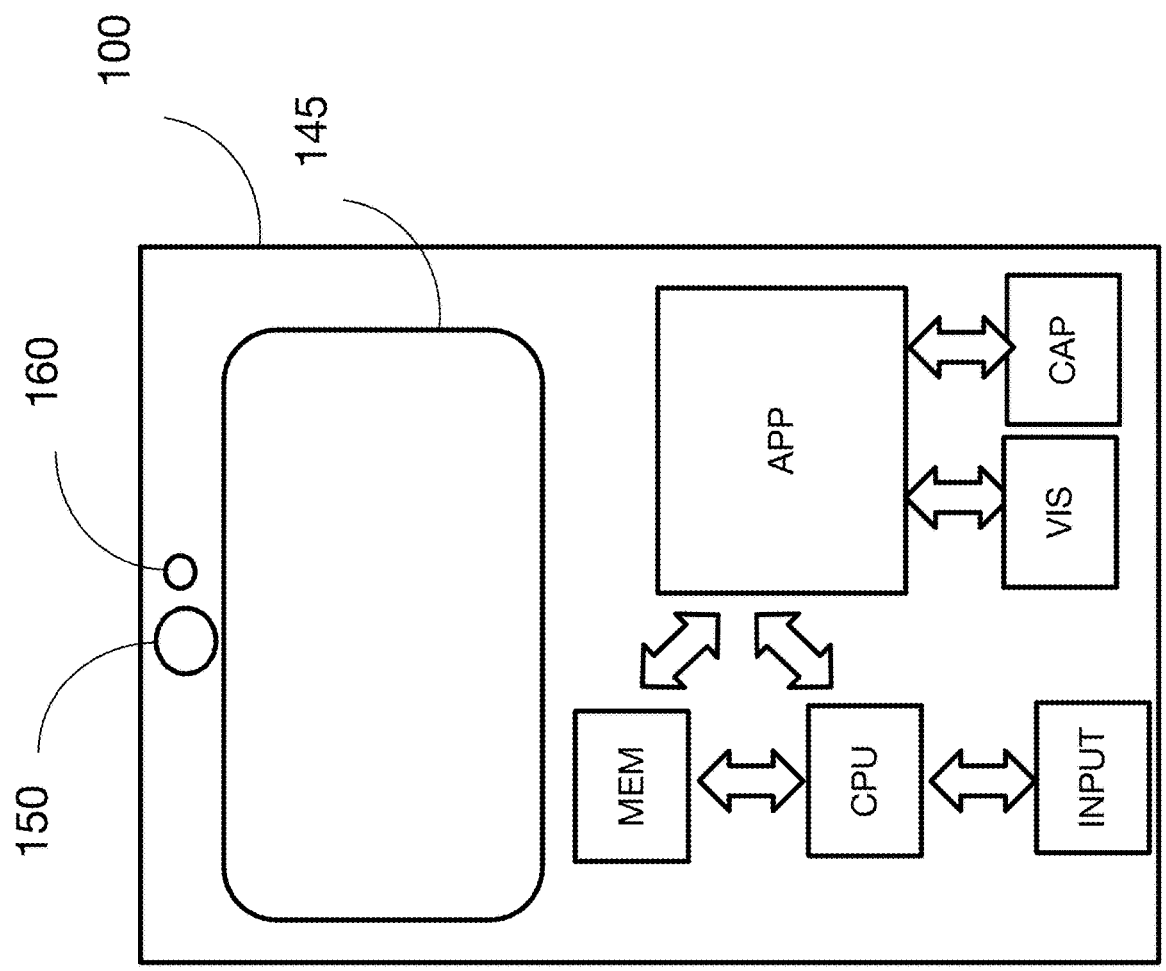
FIG. 1 illustrates an item of equipment integrating the method here described.

FIG. 1 illustrates an item of electronic equipment comprising mainly a content consultation/viewing device, and two devices for contents capture, a photo or video capture device, and an audio capture device. In an alternative manner, these two types of devices may be considered distinctly in order to perform their respective main function; for example, a computer having a consultation/viewing application for digital contents and a webcam connected to this computer by wired or non-wired connection.

In the description which follows, the electronic equipment is illustrated as a mobile device 100. The mobile device 100 comprises a display device 145, a processor CPU, an input device INPUT and an application-related module APP characterizing the method here presented. In the present device, the user interaction and the manipulation of the rendering of the application-related module on a graphical interface can be obtained by using the display device 145, which in this example is a touchscreen coupled functionally to the processor CPU controlling the interface displayed. The input device INPUT and the display device 145 are thus merged. Certain mobile devices 100 may also exhibit an input device INPUT such as a keypad.

The processor CPU can control the rendering and/or the display of the graphical interface on the display device 145 as a function of the type of applications; native applications or third-party applications. The processor CPU can also manage the user inputs according to the present method. The touch panel 145 can be seen as an input device allowing interactions with a finger of a user or other devices such as a stylus. The touch sensor interface or the touch panel 145 can include any appropriate circuit for converting the analog signals corresponding to the touch input received on its surface into any appropriate numerical touch input datum. Such touch input data may, for example, be used to perform selections of parts of the graphical interface of an application. The input received from the contact of a user is sent to the processor CPU. The touch panel 145 is configured to detect and signal the location of the contact point to the processor CPU, which can interpret the buttons in accordance with the application and with the graphical interface in progress. For example, the processor CPU can launch a task, for example a digital contents consultation/viewing application VIS or a photos/video capture application CAP.

In the present application, the application VIS is for example the native application making it possible to view photos/videos, in particular arising from various types of format, and the application CAP is the native application making it possible to capture photos. The application-related module APP can dialog with these two applications VIS and CAP. In particular, the application-related module APP can analyze the photos captured by the application CAP.

The memory MEM groups together a work memory and a memory making it possible in particular to store the digital contents, even temporarily. The capture device 150 makes it possible in particular to take a photo or video of the observer or observers of the method here described. The microphone 160 makes it possible to record the ambient sound of the scene of the observer or observers.

Figure 2:
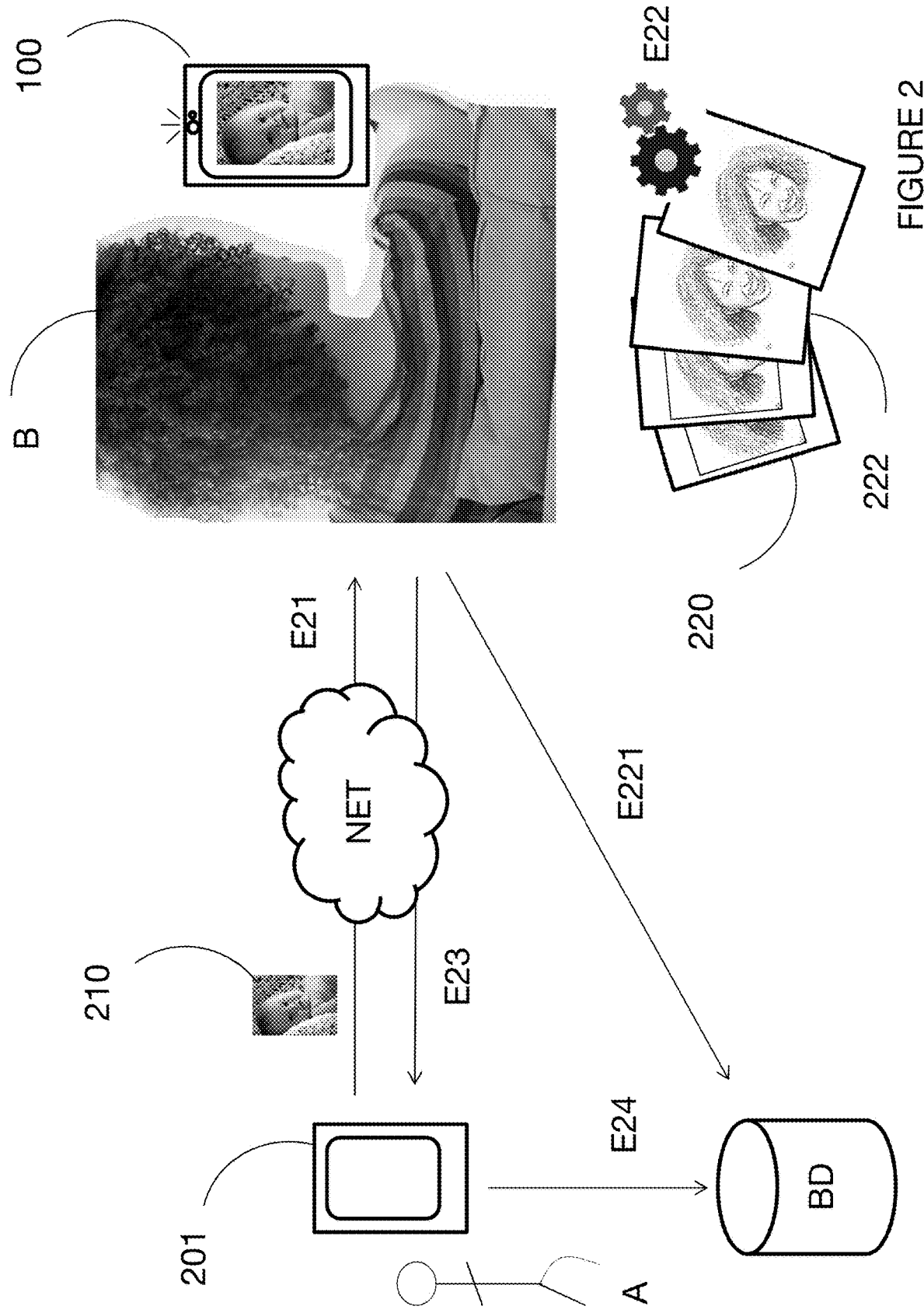
FIG. 2 illustrates an embodiment of the method.

FIG. 2 illustrates an embodiment of the method here described.

With his mobile device 201, a user A sends, via a communication network NET which can consist of a set of heterogeneous networks, a digital content, here a photo 210, to a user B. The device 100 used by the user B is configured as described in FIG. 1 and makes it possible to perform the steps of the method such as are described in the present patent application. The photo transmitted comprises in its metadata, the latter being readable and interpretable by any viewing application, the parametrization data necessary for the implementation of the method here described. The service used here by the user to transmit this photo is a messaging service linking the digital content with an electronic message.

The digital content 210 is received by the device 100 of user B through step E21. User B thereafter interacts with the device 100 to access the viewing of the digital content 210 on the display device 145. When interpreting parametrization data, the viewing application VIS then calls upon the application-related module APP for the processing of the instructions which are dedicated to it. These instructions can be written into the metadata of the image, for example in the form of textual data or in the form of a java script program. Alternatively, a search in the network on the basis of a link or of an executable makes it possible to recover these instructions.

Thus, in this embodiment, the application-related module APP submits to the user a first request for authorization of activation of the capture application CAP and then, after validation, submits to the user a second authorization of sending of notification of the updating of perception data obtained after execution of the method here described. As soon as the photo 210 is displayed on the display device 145, the user B is referred to as "observer" of the photo 210.

In the course of the consultation of the photo, the application-related module APP, via the application CAP and the capture device 150, triggers a capturing of a photo of the observer: the capture device is directed toward the observer B. In a particular embodiment, this capturing function is performed without signaling, audible or visual, sent by the device; indeed, temporary deactivation of these signs parametrized by default may be applied. In a preferred embodiment, the result of the capturing is not presented automatically on the display device 145.

The result of this capturing is thereafter processed by the application-related module APP. In this particular embodiment, a capturing of images in burst mode leads to the consideration, as input of the analysis module, of a series of temporally ordered images 220 of the observer. In this embodiment, the burst mode is parametrized to capture a photo as soon as the photo 210 is presented on the display device 145 of the device 100 by taking a photo at regular intervals for example during the first 3 seconds of presentation. The interval of the capture takes between each image can be parametrized by the device 100 or by parametrization data indicated in the image 210.

For step E22 of analyzing the photos performed of the observer, a first sub-step consists in launching the search for an identification, here of the observer B, on the basis of a module for detecting and recognizing faces and of one or more databases accessible by the device 100: if identification does not take place on the basis of the first image, the second image is considered, and so on and so forth. Modules for analysis detection and recognition of faces of the prior art are used in this method.

In a second sub-step of this step E22, an analysis of distinctive elements, performed by the application-related module APP consists in selecting an image from among this series of images. The selected image 222 is determined as the first image constituting a "significant" transition between two chronologically ordered images. By significant transition is meant a maximum distance between two temporally ordered images, the result of evaluating one or more physical differences of an observer's face, these differences being evaluated quantitatively by several indicators defined by a module for morphological analysis of faces. Morphological analysis modules for recognizing emotions on the basis of faces exist in the prior art and are used in this method.

Thus the first image constituting a significant transition is the image referenced as element 222 in FIG. 2.

The module, contained in the application-related module APP, for analyzing the distinctive elements of the image 222 thereafter rates a facial expression on the basis of a database of reference expressions: joy, surprise, fear, anger, disgust, sadness, neutral state, etc.

Thereafter, a transposition module contained in the application-related module APP transposes this expression into perception data according to a given format. Finally, a management module contained in the application-related module APP adds these data to the perception data which relate to the content and are for example stored in a database BD placed in the network, during a step E221. Alternatively, these data are also stored in a local database of the device 100 or in the metadata of the photo 210. In this particular embodiment, the second content is deleted from the memory of the device MEM.

In this embodiment, a notification of the updating of the perception data of this photo 210 is sent automatically, for example to the user A by step E23. In this embodiment, the address of the recipient is written within the metadata of the photo so that the application-related module APP can manage the sending, for example by a message via instant messaging service.

Over time, this database of perception data is fed with the data arising from the episodes of viewing of user A and/or of user B as well as the other observers of this photo 210. Thus a history of perception data of the photo 210 over time is constructed, through the receiving of these data over time, at the disposal of user A (E24) and/or of user B.

It goes without saying that the embodiment which has been described hereinabove has been given purely by way of wholly nonlimiting indication, and that numerous modifications can easily be made by the person skilled in the art without however departing from the scope of the invention.

Figure 3:
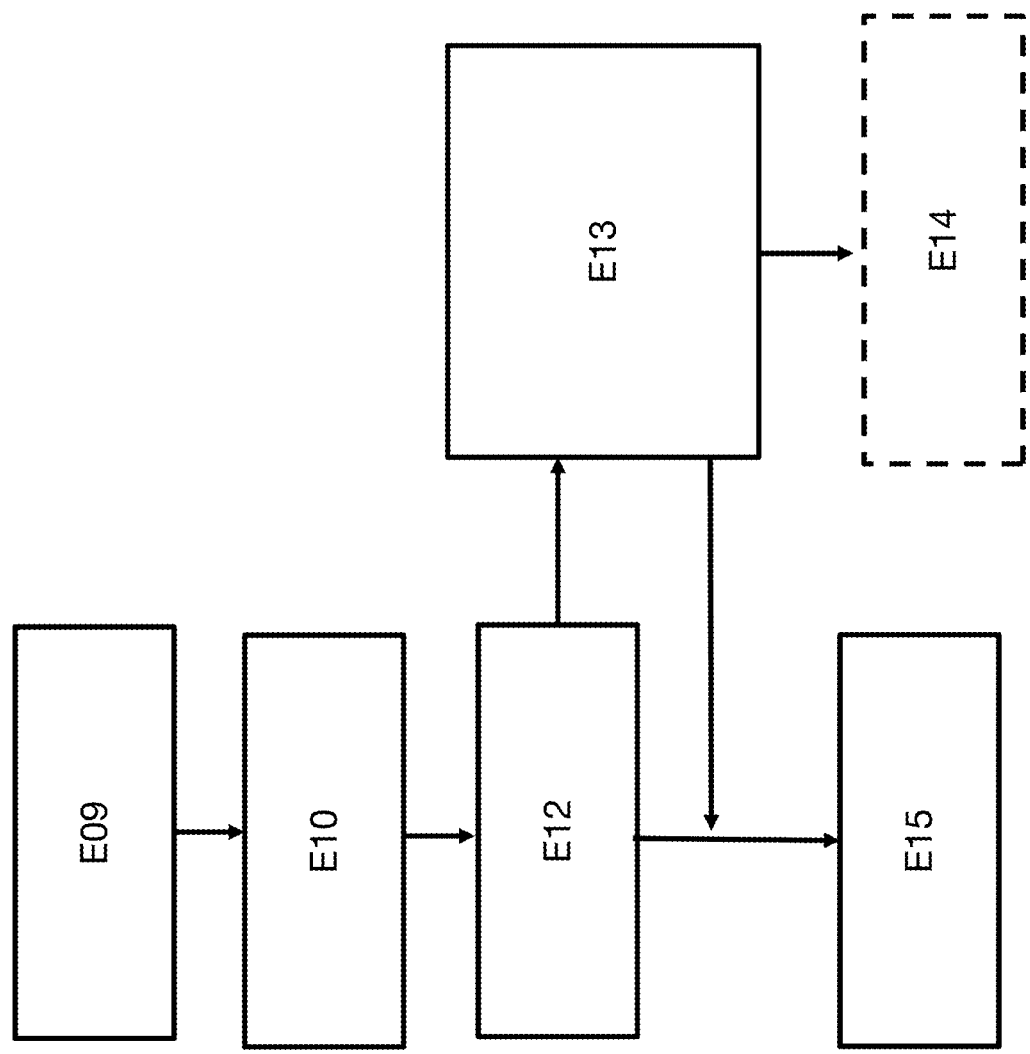
FIG. 3 illustrates the main steps carried out for the implementation of an embodiment of the method of the invention.

FIG. 3 illustrates the main steps carried out for the implementation of an embodiment of the method of the invention.

In the method here described, the first step E09 consists in accessing the consultation/viewing of the first content by launching the reading of a video or of an audio recording or else in displaying a photo on the display device 145. In parallel, in this example, this digital contents consultation application interprets the data written into the metadata of the photo, in order to determine the activation or non-activation of the capture device during step E10: user B validates the activation of the capture device, and also validates for example a given mode of capture. In one embodiment, the instructions actually stipulate the capture mode desired by the method: an image/photo, a series of photos, a video or an audio recording. Alternatively, a different mode of capture can be chosen by user B. These parametrizations can be performed by default in the settings of his device so as to limit repeated requests if user B so desires.

The triggering of the capture device in step E12 is performed in an opportunistic manner, either in a programmed manner or as a function of the context (type of content viewed, user preference, analysis success feedback, storage space available, etc.). For example, according to the feedback of the automatic fine tuning of the capture device, the capture mode can adapt (lighting, etc.). Modes can also be combined: audio recording and capture of a photo. In a preferred embodiment a burst mode is launched as soon as the consultation is launched.

Step E13 constitutes an analysis of the second captured content so as to extract a photo (in the case of a photo or a series of photos or a video) for an analysis of visual expressions, and/or a series of words (in the case of a video or of an audio recording) for a semantic analysis of the recorded words. In one embodiment, the identification of the observer or observers is performed prior to this analysis phase. Indeed, the prior art comprises various face detection and recognition applications, in particular in photo management applications.

The method compiles data of triplet type (date of consultation, identification of the observer, spontaneous emotion) updated in one or more databases. In one embodiment where the observer has requested access to the image termed significant image, in addition to access to the perception data, the identification of the observer or observers may be validated directly by the observer. In an optional step E14, the automatic erasure of the content generated by the method is performed by default so as to free up the memory. Alternatively, the observer can prevent the automatic erasure of these data generated for the analysis, that is to say the photos or the words selected for the analysis, in order to access these data.

The last step E15 of the method comprises the addition of the perception data to the data descriptive of the content, in particular to the metadata of the content or to a digital file relating to this content, which may or may not be stored with said content.

Figure 4:
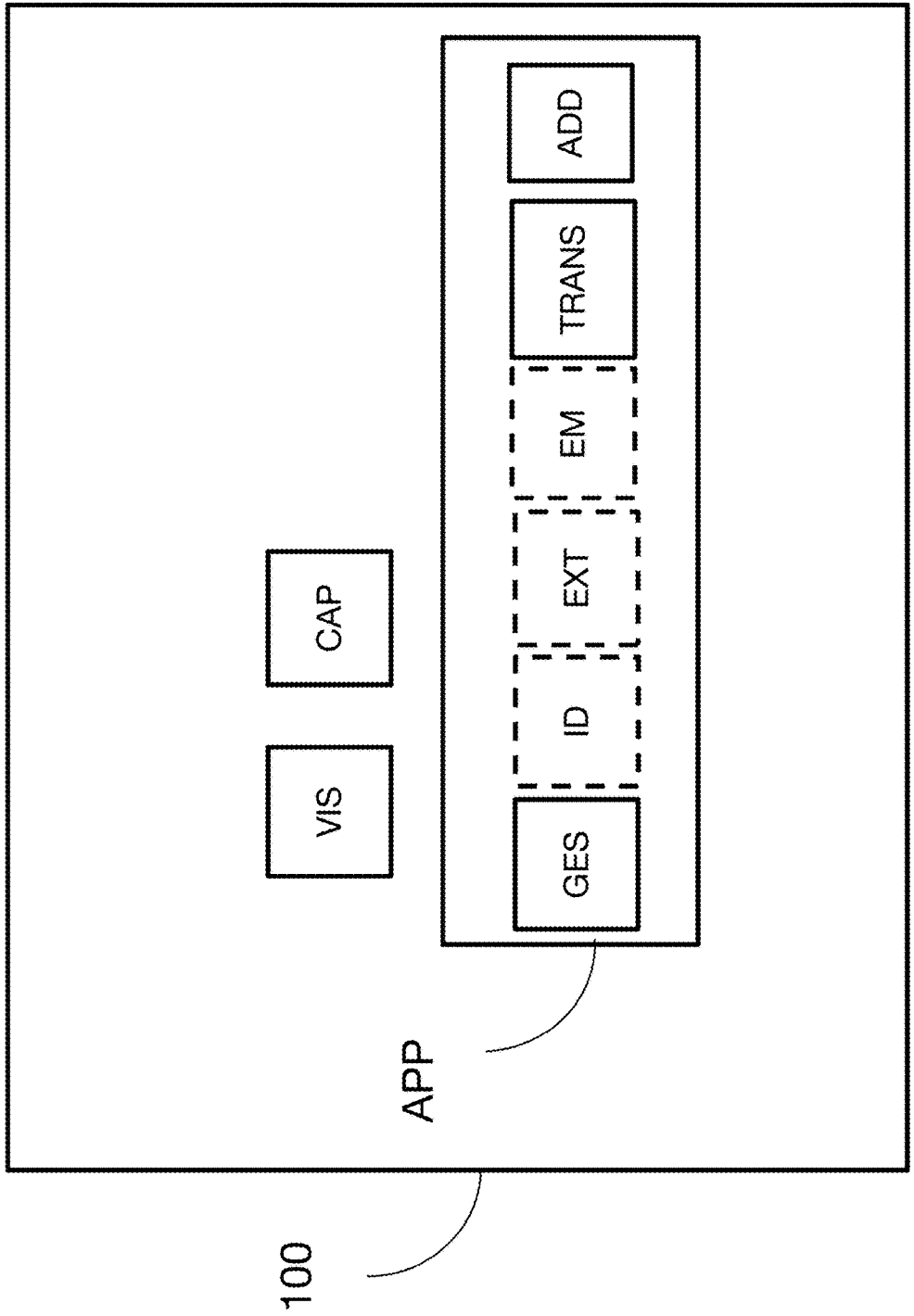
FIG. 4 illustrates the application-related modules contained in the module APP.

FIG. 4 illustrates the application-related modules contained in the application-related module APP.

The consultation application VIS and the capture application CAP are native applications or those of a third-party of the mobile device 100 driving respectively the display device 145, and the capture devices 150 and 160 of FIG. 1. The consultation application VIS integrates the capacity of interpretation of the data specific to the method integrated into the first content. The application-related module APP integrates in particular a management module GES of the method making it possible to communicate with the applications VIS and CAP.

The application-related module APP integrates the management module GES, a module for identification by detection and recognition of faces ID, an extraction module EXT which extracts data within the second content (one or more images, or one or more words) on the basis of which the emotions will be analyzed by an emotions analysis module EM. Alternatively, the modules ID, EXT and/or EM can be located outside of the application-related module APP: within the device 100 or within one or more devices located in the communication network.

A transposition module TRANS constitutes the phase of formatting into perception data such as defined by a format defined by the method, in particular according to the formats of databases or format of the metadata. The triplet relating to the method in the form—date of consultation, identification of the observer, spontaneous emotion—is the common format recognized by the consultation application VIS.

An association module ADD updates the perception data within the content, in particular in the metadata of the content, or in local databases or databases contained in the network, such as the database BD.

In the present text, the modules can be implemented in software form, in which case it takes the form of a program executable by a processor, or in hardware form, as an application specific integrated circuit (ASIC), a system on chip (SOC), or in the form of a combination of hardware elements and applications, such as for example an application program intended to be loaded and executed on a component of FPGA (Field Programmable Gate Array) type.

Although described through a certain number of detailed exemplary embodiments, the proposed method and the subject matter for the implementation of the method comprise alternative variants, modifications and enhancements which will be apparent in an obvious manner to the person skilled in the art, it being understood that these alternative variants, modifications and enhancements form part of the scope of the invention, such as defined by the claims which follow. Moreover, various aspects and characteristics described hereinabove can be implemented together, or separately, or else substituted for one another, and together the various combinations and sub-combinations of the aspects and characteristics form part of the scope of the invention. Furthermore, it may happen that certain devices and subject matter described hereinabove do not incorporate the totality of the modules and functions described in respect of the preferred embodiments.

The invention claimed is:

1. A method implemented by a processor of an item of electronic equipment, comprising:
   detecting a consultation by at least one individual of a first content displayed on a display device of said item of electronic equipment,
   in response to the detecting, triggering at least one capture with a capture device of a second content related to a scene comprising a position of the at least one individual consulting the first digital content, the triggering synchronizing activation of the capture device with a start of the consultation such that the at least one capture of the second content is performed in a time period which begins at the start of the consultation of the first content, in a burst mode with a fixed time interval between successive captures,
   analyzing distinctive elements of the second content to identify at least one visual and/or verbal emotional expression of the individual consulting the first digital content and transposing said identified emotional expression into perception data, and enriching an emotional history associated with said first content with said perception data.

2. The method as claimed in claim 1, in which analyzing distinctive elements of the second content comprises identifying the at least one individual.

3. The method as claimed in claim 1, in which the perception data of the emotional history are contained in the first content.

4. The method as claimed in claim 1, in which the second content corresponds to one or more contents of image type.

5. The method as claimed in claim 1, in which the at least one capture is defined by at least one capture of an image performed in the time period which begins at the start of the consultation of the first content.

6. The method as claimed in claim 1, in which the at least one capture is defined by a capture of an audio and/or video content performed in the time period which begins at the start of the consultation of the first content.

7. The method as claimed in claim 6, in which analyzing distinctive elements of the second content comprises selecting at least one image of said video content.

8. The method as claimed in claim 6, in which analyzing distinctive elements of the second content comprises a semantic analysis of said audio content.

9. The method as claimed in claim 1, in which the consultation of the first content comprises a request for authorization of activation of the capture device to the at least one individual.

10. The method as claimed in claim 9, in which the request for authorization of activation of the capture device is made during the request, made by the at least one individual, for access to the first content.

11. The method as claimed in claim 9, in which the consultation of the first content also comprises a request for authorization to send the perception data of the first content to at least one recipient.

12. The method as claimed in claim 1, further comprising deleting the second content when the association of the perception data with the first content is terminated.

13. An item of electronic equipment comprising:
a processor;
a non-transitory computer-readable medium comprising an application-related module, stored on thereon, which when the application-related module is executed by the processor, configures the item of electronic equipment to implement a method comprising:
detecting a consultation, by at least one individual, of a first content displayed on a display device of said item of electronic equipment,
in response to the detecting, triggering one or more captures with a capture device of a second content related to a scene comprising a position of the at least one individual consulting the first digital content, the triggering synchronizing activation of the capture device with a start of the consultation such that the at least one c apture of the second content is performed in a time period which begins at the start of the consultation of the first content, in a burst mode with a fixed time interval between successive captures,
analyzing distinctive elements of the second content to identify at least one visual and/or verbal emotional expression of the individual consulting the first digital content and transposing said identified emotional expression into perception data, and enriching an emotional history associated with the first content with said perception data.

14. A non-transitory computer-readable data medium on which has been stored at least one series of program code instructions for execution of the method of claim 1.

15. The method of claim 1 wherein said content comprises an image, an audio and/or a video type.

16. The method of claim 1 wherein said analyzing uses a database of reference emotional expressions.

17. The method of claim 1 wherein said second content comprises an ambient sound of the scene comprising the position of the at least one individual consulting the first digital content.

18. The item of equipment of claim 13 wherein said analyzing uses a database of reference emotional expressions.

19. The item of equipment of claim 13 wherein said second content comprises an an ambient sound of the scene comprising the position of the at least one individual consulting the first digital content.

20. A method implemented by a processor of an item of electronic equipment, comprising:
detecting a consultation by at least one individual of a first content displayed on a display device of said item of electronic equipment,
in response to the detecting, triggering at least one capture with a capture device of a second content related to a scene comprising a position of the at least one individual consulting the first digital content, the triggering synchronizing activation of the capture device with a start of the consultation such that the at least one capture of the second content is performed after a standby time after the start of the consultation of the first content,
analyzing distinctive elements of the second content to identify at least one visual and/or verbal emotional expression of the individual consulting the first digital content and transposing said identified emotional expression into perception data, and
enriching an emotional history associated with said first content with said perception data.

21. An item of electronic equipment comprising:
a processor; and
a non-transitory computer-readable medium comprising an application-related module, stored on thereon, which when the application-related module is executed by the processor, configures the item of electronic equipment to implement a method comprising:
detecting a consultation by at least one individual of a first content displayed on a display device of said item of electronic equipment,
in response to the detecting, triggering at least one capture with a capture device of a second content related to a scene comprising a position of the at least one individual consulting the first digital content, the triggering synchronizing activation of the capture device with a start of the consultation such that the at least one capture of the second content is performed after a standby time after the start of the consultation of the first content,
analyzing distinctive elements of the second content to identify at least one visual and/or verbal emotional expression of the individual consulting the first digital content and transposing said identified emotional expression into perception data, and enriching an emotional history associated with said first content with said perception data.

* * * * *